United States Patent
Verbockhaven et al.

(10) Patent No.: US 6,293,997 B1
(45) Date of Patent: Sep. 25, 2001

(54) METHOD AND DEVICE FOR SUPPLYING SEVERAL WORKING GASES, AND ITS APPLICATION TO AN INSTALLATION FOR ASSEMBLING ELECTRONIC COMPONENTS

(75) Inventors: Denis Verbockhaven; Claude Bonet, both of Paris; Thierry Sindzingre, Cachan, all of (FR)

(73) Assignee: L'Air liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/423,296

(22) PCT Filed: Apr. 24, 1998

(86) PCT No.: PCT/FR98/00822

§ 371 Date: Nov. 9, 1999

§ 102(e) Date: Nov. 9, 1999

(87) PCT Pub. No.: WO98/57729

PCT Pub. Date: Dec. 23, 1998

(30) Foreign Application Priority Data

Jun. 17, 1997 (FR) .................................................. 97 07507

(51) Int. Cl.$^7$ ............................. B01D 53/22; B01D 53/04
(52) U.S. Cl. ............................. 95/54; 95/138; 96/4; 96/9; 96/136
(58) Field of Search ............................. 95/54, 138; 96/4, 96/7, 9, 108, 134, 136

(56) References Cited

U.S. PATENT DOCUMENTS

| | | | |
|---|---|---|---|
| 4,681,602 | * 7/1987 | Glenn et al. ........................... | 95/54 X |
| 4,832,714 | * 5/1989 | Gerdts ........................................ | 96/4 |
| 4,894,068 | * 1/1990 | Rice ....................................... | 95/54 X |
| 4,931,070 | * 6/1990 | Prasad ..................................... | 96/9 X |
| 5,069,692 | * 12/1991 | Grennan et al. ............................ | 96/4 |
| 5,102,432 | * 4/1992 | Prasad ..................................... | 95/54 |
| 5,163,978 | * 11/1992 | Leavitt et al. ............................. | 95/8 |
| 5,169,412 | * 12/1992 | Prasad et al. ......................... | 95/54 X |
| 5,169,415 | * 12/1992 | Roettger et al. .......................... | 95/54 |
| 5,207,806 | * 5/1993 | Lagree et al. .............................. | 95/8 |
| 5,290,341 | * 3/1994 | Barbe ...................................... | 95/54 |
| 5,378,263 | * 1/1995 | Prasad ..................................... | 95/54 |
| 5,472,480 | * 12/1995 | Barbe ...................................... | 95/54 |
| 5,507,855 | * 4/1996 | Barry ................................... | 95/54 X |
| 5,730,780 | * 3/1998 | Booth, III ............................. | 95/54 X |
| 5,827,351 | * 10/1998 | Prasad et al. ......................... | 95/54 X |
| 5,829,272 | * 11/1998 | Barry ................................... | 95/54 X |

FOREIGN PATENT DOCUMENTS

| | | | |
|---|---|---|---|
| 0335418 | * 10/1989 | (EP) | ........................ 95/54 |
| 0 596 268 | 5/1994 | (EP) . | |
| 0 635 456 | 1/1995 | (EP) . | |

* cited by examiner

Primary Examiner—Robert H. Spitzer
(74) Attorney, Agent, or Firm—Burns, Doane, Swecker & Mathis, L.L.P.

(57) ABSTRACT

A method for delivering at least two working gases from a common air supply comprising the steps of depleting the air in $O_2$ in order to obtain a first gas mixture having an $O_2$ content less than or equal to t1; delivering at least a portion of this first gas mixture as a first working gas; depleting another portion of this first gas mixture in $O_2$ in order to obtain the second gas mixture having an $O_2$ content less than or equal to t2, wherein t1 is greater than t2; and delivering the second gas mixture as a second working gas.

24 Claims, 2 Drawing Sheets

METHOD AND DEVICE FOR SUPPLYING SEVERAL WORKING GASES, AND ITS APPLICATION TO AN INSTALLATION FOR ASSEMBLING ELECTRONIC COMPONENTS

BACKGROUND OF THE INVENTION

Field of the Invention

The present invention relates to a method for delivering at least two working gases, having different limiting $O_2$ contents, from a common air supply.

Many industrial processes require the use of $N_2/O_2$ working atmospheres having different limiting $O_2$ contents. Such processes are sometimes employed on the same industrial site.

This is the case, for example, in the electronics industry in which the reflow-soldering and wave-soldering processes for assembling electronic components make use of $N_2/O_2$ atmospheres typically having limiting $O_2$ contents of respectively a few % in one case and a few thousand ppm in the second case.

Depending on the limiting $O_2$ content to be obtained, several means for depleting the air from the supply in $O_2$ may be used: cryogenic distillation, adsorption of oxygen on a catalytic bed, combination of oxygen with another gas, or selected permeation through a membrane.

In general, in order to deliver $N_2/O_2$ working atmospheres of different limiting $O_2$ contents for the implementation of industrial processes on the same site, either separate delivery means are used, thus multiplying the working-gas delivery devices, or a single atmosphere feed is used for all the processes, thus resulting in superfluous depletion in $O_2$ for some of the processes. Such solutions are not optimal.

The object of the invention is to remedy the abovementioned problem and, in particular, to provide an economic method for delivering working gases having different limiting $O_2$ contents from a common air supply.

For this purpose, the subject of the invention is a method for delivering at least two working gases from a common air supply, the limiting $O_2$ contents, respectively t1 and t2, of which gases are such that t1 is greater than t2, characterized in that:

the air is depleted in $O_2$ in order to obtain a first gas mixture having an $O_2$ content less than or equal to t1;

a portion of this first gas mixture is used to deliver the first working gas;

another portion of this first gas mixture is depleted in $O_2$ in order to obtain a second gas mixture having an $O_2$ content less than or equal to t2; and this second gas mixture is used to deliver the second working gas.

Depending on the particular embodiments, the method may include one or more of the following characteristics:

said first and second gas mixtures are the working gases directly;

at least one oxygen-containing product resulting from one of said depletions in $O_2$ is recovered for the purpose of using this oxygen-containing product;

the oxygen-containing product is superoxygenated air coming from the first depletion in $O_2$;

$t_1$ is greater than or equal to 0.5% (and preferably between 0.5% and 10%) and $t_2$ is less than or equal to 1% (and preferably between 100 ppm and 5000 ppm).

The subject of the invention is also a device for delivering at least two working gases, having different limiting $O_2$ contents, from a common air supply, characterized in that it comprises:

first means of depletion in $O_2$;

second means of depletion in $O_2$;

means connecting an inlet of the first means of depletion in $O_2$ to the air supply;

means connecting an inlet of the second means of depletion in $O_2$ to an outlet of the first means of depletion;

means for producing the first working gas, these being connected to an outlet of the first means of depletion; and means for producing the second working gas, these being connected to an outlet of the second means of depletion.

Depending on particular embodiments, the device may include one or more of the following characteristics:

the means for producing the working gases are means for tapping off the gas mixtures directly to the outlet of the means of depletion;

means of depletion in $O_2$ have an outlet for oxygen-containing product, and the device comprises means connecting this outlet to a unit for consuming this oxygen-containing product;

the oxygen-containing product is superoxygenated air coming from the first means of depletion;

the first and/or second means of depletion in $O_2$ are means of depletion in $O_2$ by combination of the $O_2$ with another gas or by adsorption of the $O_2$ on a catalytic bed or else by selective permeation through a membrane.

Finally, the subject of the invention is a plant for the assembly of electronic components, comprising a chamber for storing electronic components in a controlled atmosphere, the limiting $O_2$ content of the atmosphere in this chamber being $t_1$, and at least one machine for assembling the components in a controlled atmosphere, the limiting $O_2$ content of the atmosphere in this machine being $t_2<t_1$, the plant being characterized in that it comprises a device for delivering working gases, which feeds said chamber with said first gas mixture and said assembly machine with said second gas mixture.

The invention will be better understood on reading the description which follows, given solely by way of example, and with reference to the appended figures.

DETAILED DESCRIPTION OF PREFERRED EMBODIMENTS

Figure 1:
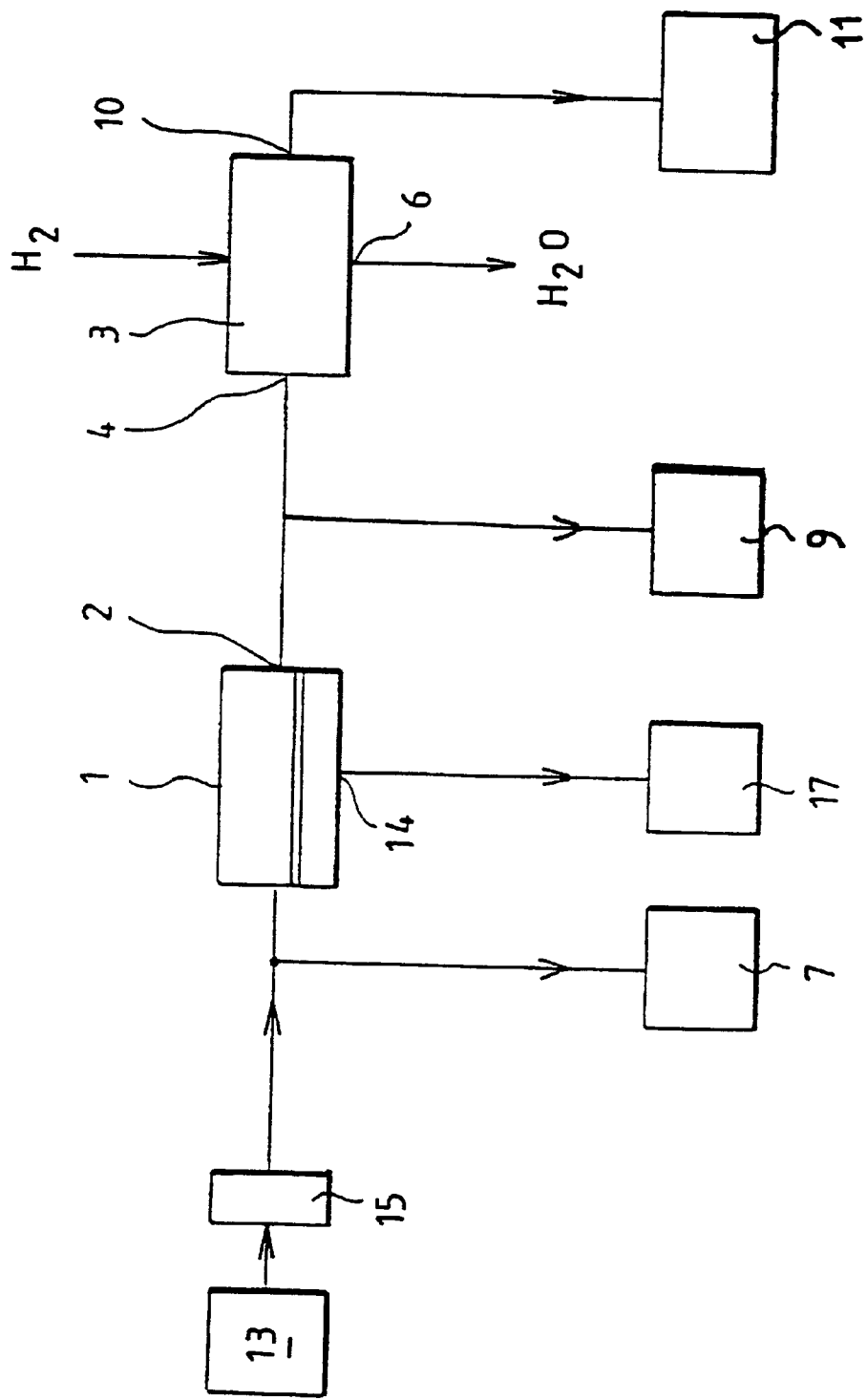
FIG. 1 shows diagrammatically a device for delivering working gases according to the invention, which feeds two user stations (9, 11) whose requirements in working gas differ.

The device in FIG. 1 comprises first means 1 of depletion in $O_2$ by selective permeation through a polymer membrane and second means 3 of depletion in $O_2$ by catalytic combination of the latter with hydrogen.

This device is intended to deliver the working atmospheres for a reflow-soldering oven 9 and for a wave-soldering machine, forming part of a plant for the assembly of electronic components.

Before their assembly in the reflow oven 9 or in the wave-soldering machine 11, the electronic components are stored in the electronic-component storage chamber 7 located upstream of the means 1.

The chosen working atmospheres at the various points in the plant shown are as follows:

air from the air supply 13 is tapped off in order to feed the storage chamber 7, this air having beforehand been filtered, removed of any dust and dried, using the apparatus 15;

the means 1 of depletion in $O_2$ use the conventional process of depleting the air coming from the source 13 in $O_2$ by selective permeation through a polymer membrane, and delivering, at their residual outlet 2, an $N_2/O_2$ mixture having in this case an $O_2$ content close to 1%. This mixture feeds, on the one hand, an electronic-component reflow-soldering oven 9 directly and, on the other hand, an inlet 4 of the second means 3 of depletion in $O_2$;

the second means 3 of depletion in $O_2$ use a conventional process for catalytically combining oxygen with hydrogen in order to form water. These means 3 comprise a dryer making it possible to condense the water produced, and removed at 6, and to obtain a gas depleted in $O_2$ at their outlet 10.

The $N_2/O_2$ mixture produced at the outlet 10 of the means 3 has an $O_2$ content close to 50 ppm, feeding an electronic-component wave-soldering machine 11 directly.

The permeate mixture obtained at the second outlet 14 of the first means 1 of depletion in $O_2$ is superoxygenated air having an $O_2$ content close to 25%, used for feeding a superoxygenated-air-consuming unit 17.

This unit 17 may, for example, be an oven and may be located on the same industrial site as the plant for assembling the electronic components. The superoxygenated air obtained may thus be used to feed the flames of burners intended to melt the glass involved in the manufacture of television tubes.

The device according to the invention therefore makes it possible, by successive depletions of the air from the source 13 in $O_2$, to feed with working gases processes whose limiting $O_2$ contents are very different.

The method for delivering working gases employed is particularly economical since, on the one hand, it uses common means of depletion of $O_2$ to deliver working gases of different limiting $O_2$ content and, on the other hand, it eliminates the superfluous depletions of $O_2$.

Figure 2:
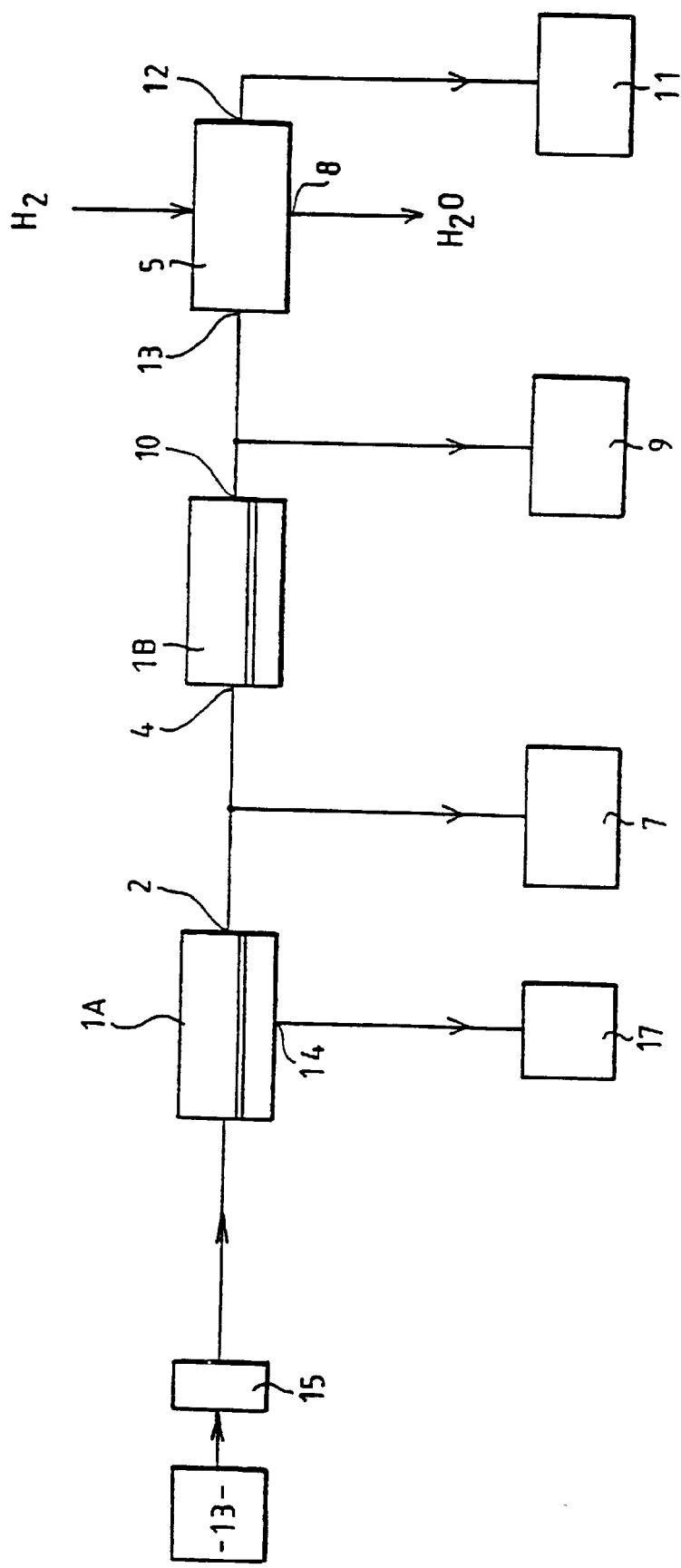
FIG. 2 shows schematically another device for delivering working gases according to the invention, which feeds three user stations (7, 9, 11) whose requirements in working gas differ.

More briefly, FIG. 2 illustrates a case in which first (1A), second (1B) and third (5) means of depletion in oxygen are used, these being, respectively:

a membrane separator 1A, making it possible to produce, at its residual outlet 2, an $N_2/O_2$ gas mixture having a residual oxygen content close to 10%, so as to feed a component-storage chamber 7 with this mixture;

a membrane separator 1B, making it possible to produce, at its residual outlet 10, an $N_2/O_2$ gas mixture having a residual oxygen content typically ranging from 1 to 3%, so as to feed a component reflow-soldering oven 9 with this mixture;

means 5 of deoxygenation by the catalytic reaction of oxygen with hydrogen in order to form water. These means 5 comprise a dryer making it possible to condense the water produced, and removed at 8, and to obtain at their outlet 12 an $N_2/O_2$ mixture whose $O_2$ content is close to 50 ppm, feeding an electronic-component wave-soldering machine 11 directly.

What is claimed is:

1. A method for delivering at least two working gases from a common air supply, in an electronic component plant comprising the steps of:

depleting the air in $O_2$ in order to obtain a first gas mixture having an $O_2$ content less than or equal to t1;

delivering at least a portion of this first gas mixture as a first working gas to a chamber for storing electronic components in a controlled first atmosphere;

depleting another portion of this first gas mixture in $O_2$ in order to obtain a second gas mixture having an $O_2$ content less than or equal to t2, wherein t1 is greater than t2; and delivering the second gas mixture as a second working gas to at least one machine for assembling the components in a controlled second atmosphere.

2. The method according to claim 1, comprising employing said first and second gas mixtures themselves as the working gases.

3. The method according to claim 1, further comprising recovering at least one oxygen-enriched product resulting from one of said steps of depleting $O_2$ for further use.

4. The method according to claim 3, wherein said oxygen-enriched product is superoxygenated air coming from the first step of depleting $O_2$.

5. The method according to claim 1, wherein t1 is greater than or equal to 0.5%.

6. The method according to claim 5, wherein t1 is between 0.5% and 10%, and t2 is between 100 ppm and 5000 ppm.

7. The method according to claim 5, wherein t1 is between 0.5% and 10%.

8. The method according to claim 1, wherein t2 is less than or equal to 1%.

9. The method according to claim 8, wherein t2 is between 100 ppm and 5000 ppm.

10. A method for delivering at least two working gases from a common air supply, the method comprising the steps of:

depleting the air in $O_2$ using a first $O_2$ depletion process in order to obtain a first gas mixture having an $O_2$ content less than or equal to t1;

delivering at least a portion of this first gas mixture as a first working gas;

depleting another portion of this first gas mixture in $O_2$ using a second $O_2$ depletion process in order to obtain a second gas mixture having an $O_2$ content less than or equal to t2, wherein t1 is greater than t2; and delivering the second gas mixture as a second working gas;

wherein said first $O_2$ depletion process and said second $O_2$ depletion process cannot both be a process wherein $O_2$ is depleted by selectively permeating $O_2$ through a membrane.

11. The method of claim 10, wherein said first and said second $O_2$ depletion processes are selected from the group consisting of a process wherein $O_2$ is depleted by combining $O_2$ with another gas, a process wherein $O_2$ is depleted by absorbing $O_2$ on a catalytic bed, and a process wherein $O_2$ is depleted by being selectively permeated through a membrane.

12. A device for delivering at least first and second working gases, comprising different limiting $O_2$ contents, from a common air supply, comprising:

at least first and second means for depleting the air in $O_2$; wherein said at least first and second means for depleting the air in $O_2$ do not both constitute a means wherein $O_2$ is depleted by being selectively permeated through a membrane;

means connecting an inlet of the first means of depleting in $O_2$ to the air supply;

means connecting an inlet of the second means of depleting in $O_2$ to an outlet of the first means of depletion;

means for producing the first working gas connected to an outlet of the first means of depleting; and means for producing the second working gas connected to an outlet of the second means of depletion.

13. The device according to claim 12, wherein the means for producing the working gases are means for tapping off the gas mixtures directly to the outlet of the means of depletion.

14. The device according to claim 12, wherein the means of depleting in $O_2$ have an outlet for an oxygen-enriched product, and the device further comprises means connecting this outlet to a unit for consuming this oxygen-enriched product.

15. Device according to claim 14, wherein the oxygen-enriched product is superoxygenated air coming from the first means of depleting.

16. Device according to claim 12, wherein the first and/or second means of depleting in $O_2$ are means of depleting in $O_2$ by combination of the $O_2$ with another gas or by absorption of the $O_2$ on a catalytic bed or by selective permeation through a membrane.

17. The device according to claim 12, wherein said first and said second means for depleting the air in $O_2$ are selected from the group consisting of a means wherein $O_2$ is depleted by combining $O_2$ with another gas, a means wherein $O_2$ is depleted by absorbing $O_2$ on a catalytic bed, and a means wherein $O_2$ is depleted by being selectively permeated through a membrane.

18. A plant for the assembly of electronic components, comprising:

a chamber for storing electronic components in a controlled first atmosphere, wherein said atmosphere has a limiting $O_2$ content in this chamber of t1, and at least one machine for assembling the components in a controlled second atmosphere, wherein said second atmosphere has a limiting $O_2$ content of $t_2<t_1$, and a device for delivering working gases, which feeds said chamber with a first gas mixture, as a first working gas, and said assembly machine with a second gas mixture, as a second working gas; wherein said device for delivering working gases comprises:

at least first and second means for depleting the air in $O_2$;

means connecting an inlet of the first means of depleting in $O_2$ to the air supply;

means connecting an inlet of the second means of depleting in $O_2$ to an outlet of the first means of depletion;

means for producing the first working gas connected to an outlet of the first means of depleting; and means for producing the second working gas connected to an outlet of the second means of depletion.

19. A device for delivering at least first and second working gases, comprising different limiting $O_2$ contents, from a common air supply, comprising:

a first $O_2$ depleting device;

a second $O_2$ depleting device;

wherein said first and second $O_2$ depleting devices do not both operate using a process wherein $O_2$ is depleted by selectively permeating $O_2$ through a membrane;

a supply of air in fluid communication with an inlet of said first $O_2$ depleting device;

a conduit connecting an inlet of the second $O_2$ depleting device to an outlet of the first $O_2$ depleting device;

a second outlet to the first $O_2$ depleting device in fluid communication with a conduit which delivers said first working gas to a first desired application; and an outlet to said second $O_2$ depleting device in fluid communication with a conduit which delivers said second working gas to a second desired application.

20. The device according to claim 19, wherein said first and/or second $O_2$ depleting device comprises a membrane separation device, a catalytic adsorption device, or a reactor for reacting $O_2$ with another gas.

21. The device according to claim 19, wherein said first application is a chamber for storing electronic components in a controlled atmosphere.

22. The device according to claim 19, wherein said second application is a machine for assembling electronic components in a controlled atmosphere.

23. A plant for the assembly of electronic components, the plant comprising:

a chamber for storing electronic components in a controlled first atmosphere, wherein said atmosphere has a limiting $O_2$ content in this chamber of t1;

at least one machine for assembling the components in a controlled second atmosphere, wherein said second atmosphere has a limiting $O_2$ content of $t_2<t_1$;

a device for delivering working gases which feeds said chamber with a first gas mixture, as a first working gas, and said assembly machine with a second gas mixture, as a second working gas; wherein said device for delivering working gases comprises:

at least first and second means for depleting the air in $O_2$;

wherein said at least first and second means for depleting the air in $O_2$ do not both constitute a means wherein $O_2$ is depleted by being selectively permeated through a membrane;

means connecting an inlet of the first means of depleting in $O_2$ to the air supply;

means connecting an inlet of the second means of depleting in $O_2$ to an outlet of the first means of depletion;

means for producing the first working gas connected to an outlet of the first means of depleting; and means for producing the second working gas connected to an outlet of the second means of depletion.

24. The plant according to claim 23, wherein said first and said second means for depleting the air in $O_2$ are selected from the group consisting of a means wherein $O_2$ is depleted by combining $O_2$ with another gas, a means wherein $O_2$ is depleted by absorbing $O_2$ on a catalytic bed, and a means wherein $O_2$ is depleted by being selectively permeated through a membrane.

* * * * *